United States Patent
Ventrone et al.

(10) Patent No.: US 11,366,154 B2
(45) Date of Patent: Jun. 21, 2022

(54) ENABLING OF FUNCTIONAL LOGIC IN IC USING THERMAL SEQUENCE ENABLING TEST

(71) Applicant: GLOBALFOUNDRIES U.S. Inc., Santa Clara, CA (US)

(72) Inventors: Sebastian T. Ventrone, South Burlington, VT (US); Richard S. Graf, Gray, ME (US); Ezra D. B. Hall, Richmond, VT (US); Jack R. Smith, South Burlington, VT (US)

(73) Assignee: GLOBALFOUNDRIES U.S. INC., Santa Clara, CA (US)

( * ) Notice: Subject to any disclaimer, the term of this patent is extended or adjusted under 35 U.S.C. 154(b) by 532 days.

(21) Appl. No.: 16/527,146

(22) Filed: Jul. 31, 2019

(65) Prior Publication Data

US 2021/0033660 A1 Feb. 4, 2021

(51) Int. Cl.
*G01R 31/02* (2006.01)
*G01R 31/28* (2006.01)
*H04L 9/32* (2006.01)

(52) U.S. Cl.
CPC .......... *G01R 31/281* (2013.01); *H04L 9/3263* (2013.01); *H04L 9/3278* (2013.01)

(58) Field of Classification Search
CPC .............. G01R 31/281; G01R 31/2874; G01R 31/2875; G01R 31/31701; G01R 31/31719; H04L 9/3278; H04L 9/3263; H01L 23/34; H01L 23/345; H01L 23/522; G06F 30/392
See application file for complete search history.

(56) References Cited

U.S. PATENT DOCUMENTS

| | | | |
|---|---|---|---|
| 2007/0146056 A1* | 6/2007 | McClure | G01K 7/015 257/467 |
| 2008/0282208 A1 | 11/2008 | Anderson et al. | |
| 2010/0133691 A1 | 6/2010 | Chen et al. | |
| 2011/0273186 A1* | 11/2011 | Karnad | G01R 31/2875 324/555 |
| 2013/0300454 A1 | 11/2013 | Wang DiMarzio et al. | |
| 2014/0035560 A1* | 2/2014 | Olmos | G06F 1/28 324/76.41 |
| 2018/0017615 A1* | 1/2018 | Moody | G01R 31/2874 |

* cited by examiner

*Primary Examiner* — Thang X Le
(74) *Attorney, Agent, or Firm* — David Cain; Hoffman Warnick LLC (57) ABSTRACT

An integrated circuit (IC) includes functional logic therein that can be enabled by application of a predefined thermal cycle. The IC includes an enabling fuse operatively coupled to the functional logic, the functional logic being disabled unless enabled by activation of the enabling fuse. A set of thermal sensors are arranged in a physically distributed manner through at least a portion of the IC. A test control macro operatively couples to the set of thermal sensors and the enabling fuse for activating the enabling fuse to enable the functional logic in response to application of a thermal cycle that causes the set of thermal sensors to sequentially experience a thermal condition matching a thermal sequence enabling test. A related method and system for applying the predefined thermal cycle are also provided.

20 Claims, 7 Drawing Sheets

ENABLING OF FUNCTIONAL LOGIC IN IC USING THERMAL SEQUENCE ENABLING TEST

BACKGROUND

The present disclosure relates to integrated circuits (IC), and more specifically, to methods and systems for enabling functional logic in an IC using a thermal sequence enabling test, and a related IC.

Integrated circuits (ICs) are susceptible to reverse engineering of the chip's internal function to produce counterfeit versions of the hardware, sometimes referred to as clones. The issue is especially challenging when the ICs include sensitive designs that are highly valuable to the designer, e.g., an individual, company or nation. In particular, the reverse engineering can allow the IC design to be used for purposes other than intended by the original designer or manufacturer. Another challenge is addressing the increasing demand for securely enabling features in the IC in the field, i.e., after manufacturing, and after proper licensing. On-demand provisioning is advantageous to allow IC feature changes and customization after manufacturing.

SUMMARY

A first aspect of the disclosure is directed to an integrated circuit (IC), comprising: a body including functional logic therein; an enabling fuse operatively coupled to the functional logic, the functional logic being disabled unless enabled by activation of the enabling fuse; a set of thermal sensors arranged in a physically distributed manner through at least a portion of the body; and a test control macro operatively coupled to the set of thermal sensors and the enabling fuse for activating the enabling fuse to enable the functional logic in response to application of a thermal cycle that causes the set of thermal sensors to sequentially experience a thermal condition matching a thermal sequence enabling test.

A second aspect of the disclosure includes a method, comprising: applying a thermal cycle to an integrated circuit (IC); monitoring at least one of a temperature and a temperature duration at a set of thermal sensors in the IC; in response to the thermal cycle causing the set of thermal sensors to sequentially experience a thermal conditions matching a set of thermal sequences for an enabling test, activating an enabling fuse in the IC to enable a functional logic in the IC, the functional logic being disabled unless enabled by activation of the enabling fuse; and in response to the thermal cycle causing the set of thermal sensors to not experience the thermal condition matching the thermal sequence enabling test, permanently de-activating the enabling fuse to permanently disable the functional logic.

A third aspect of the disclosure related to a system for enabling a functional logic in an integrated circuit (IC), the system comprising: a power applicator to apply power to the IC; a passkey applicator to apply a private-public key to the IC to activate a test control macro on the IC; and a thermal control unit to apply one of a plurality of predefined thermal cycles to the IC, each predefined thermal cycle configured to create a thermal condition at a set of thermal sensors at predefined locations on the IC, wherein the test control macro on the IC enables a functional logic on the IC in response to the predefined thermal cycle causing the set of thermal sensors to sequentially experience a thermal condition matching a thermal sequence enabling test.

The foregoing and other features of the disclosure will be apparent from the following more particular description of embodiments of the disclosure.

BRIEF DESCRIPTION OF THE DRAWINGS

The embodiments of this disclosure will be described in detail, with reference to the following figures, wherein like designations denote like elements, and wherein.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

Embodiments of the disclosure provide an integrated circuit (IC) and method that helps protect hardware such that at least a portion of the IC only functions properly when it is used as intended by the original manufacturer through a special enablement process. A system to provide the method is also disclosed. The IC includes functional logic therein that is disabled unless enabled by activation of one or more enabling fuses. A set of thermal sensors are arranged in a physically distributed manner through at least a portion of the IC. A test control macro on the IC is operatively coupled to the set of thermal sensors and the enabling fuse(s) for activating the enabling fuse to enable the functional logic. The functional logic is only enabled in response to application of a thermal cycle, e.g., by an external thermal control unit, that causes the set of thermal sensors to sequentially experience a thermal condition matching a thermal sequence enabling test. The thermal sequence enabling test may dictate, for any number of thermal sensors: a sequence of temperatures, a sequence of temperatures and durations at the temperature, and/or a sequence of temperature transition rates between a pair of preset temperatures for a given thermal sensor(s). A private-public key may be optionally used with a physically un-callable function state machine on the IC to provide further access control. With the varied temperatures, temperature durations and/or temperature transition rate sequences and the different positions and quantity of thermal sensors that are possible, the number of combinations that can be programmed into the thermal sequence enabling test are extremely large. Consequently, the level of security to protect unintended use of the functional logic is significant. The time and effort necessary to reverse engineer (i.e., time to compromise) the IC and create clones, can be greatly increased compared to conventional techniques. The IC can also more readily provide on-demand provisioning of features after manufacturing, e.g., functional changes, upgrades and customization.

Figure 1:
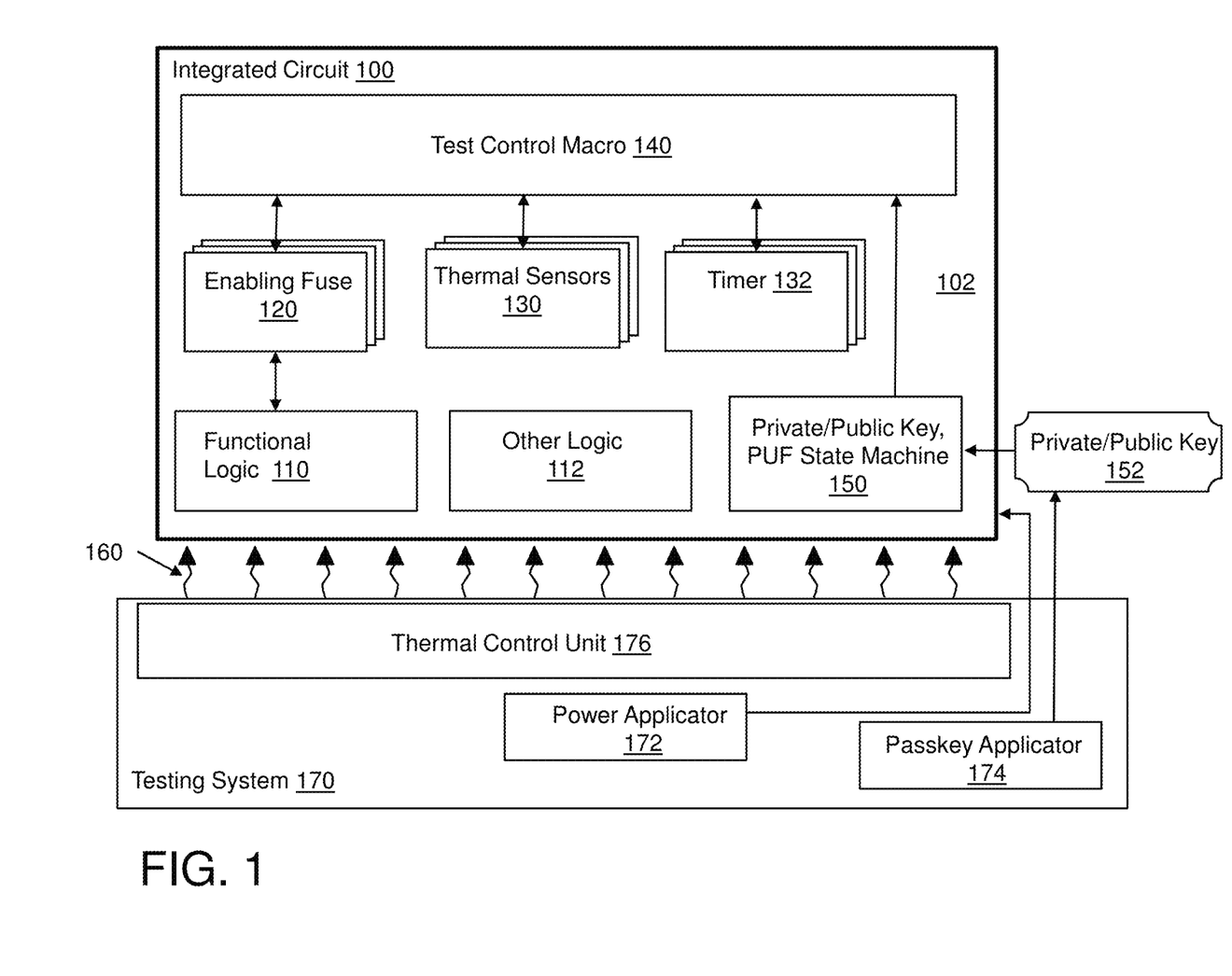
FIG. 1 shows a schematic block diagram of an integrated circuit according to embodiments of the disclosure.

Referring to FIG. 1, a schematic block diagram of an IC 100 according to embodiments of the disclosure is shown. IC 100 may include any now known or later developed integrated circuit chip having a body 102 providing any desired function, but includes functional logic 110 therein that is only to be enabled using the methods of the present disclosure, i.e., under control of a manufacturer, agent thereof, or a licensed user. Apart from functional logic 110 that may be enabled according to embodiments of the disclosure, IC 100 may include any variety of other logic 112. IC 100 may be formed using any now known or later developed IC fabrication processes.

IC 100 includes an enabling fuse 120 operatively coupled to functional logic 110. Functional logic 110 is disabled (i.e., locked) unless enabled (i.e., unlocked) by activation of enabling fuse 120. Enabling fuse 120 can include any now known or later developed switch capable of an on-off setting that enables functional logic 110, or maintains it in a disable state. For example, enabling fuse 120 can include but is not limited to: a physical fuse capable of a change in status upon application of a specified voltage, and/or a non-volatile storage device. Any number of enabling fuses 120 can be employed for each functional logic 110 section. That is, a plurality of enabling fuses 120 can be used where each of the fuses must be activated for a single functional logic 110 to be enabled. Alternatively, a plurality of enabling fuses 120 may be employed where each enabling fuse is operatively coupled to a respective portion of functional logic 110, and each portion of functional logic 110 is disabled unless enabled by activation of the respective enabling fuse 120.

Figure 2:
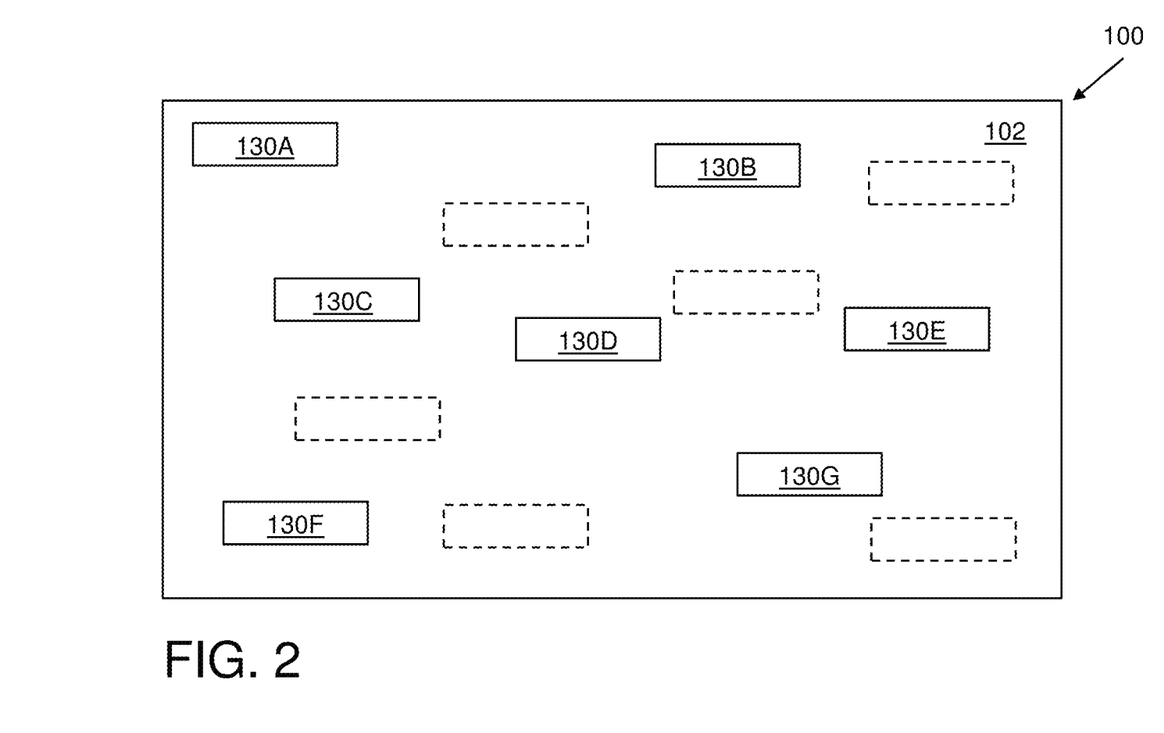
FIG. 2 shows a schematic block diagram of locations of a set of thermal sensors according to embodiments of the disclosure.

IC 100 also includes a set of thermal sensors 130. As shown in the schematic block diagram of FIG. 2, set of thermal sensors 130 are arranged in a physically distributed manner through at least a portion of body 102 of IC 100. Thermal sensors 130 can take the form of any now known or later developed structure capable of measuring a temperature in a form that can be used by a test control macro 140, described herein. A thermal sensor 130 may include are but not limited to: a thermal diode. In FIG. 2, seven thermal sensors 130A-G are shown. However, any number of thermal sensors 130 may be employed in any physical arrangement desired. The thermal sensors 130 can be physically distributed in any desired manner: evenly distributed, unevenly distributed, some clustered, only in one region, etc.

Returning to FIG. 1, IC 100 may also optionally include one or more timers 132. Timers 132 may include any solid state mechanism capable of measuring the amount of time passed by a process or activity. In the case of the instant disclosure, timer(s) 132 may measure the amount of time that a thermal sensor 130 experiences a certain temperature, e.g., 5 nanoseconds, 1 second, 10 seconds, etc. Further, timer(s) 132 may measure the amount of transition time it takes to change between a pair of temperatures for at least one of the set of thermal sensors 130. The transition time can be used to calculate a temperature transition rate between the pair of temperatures for at least one of a set of thermal sensors 130. Any number of timers 132 necessary to carry out the process described herein can be employed.

Continuing with FIG. 1, IC 100 may also include a test control macro 140 operatively coupled to at least set of thermal sensors 130A-G (FIG. 2) (collectively, 130) and enabling fuse(s) 120. Test control macro 140 may also be operatively coupled to timers 132, where provided. Test control macro 140 may include any now known or later developed solid state computational element, state machine and/or logic capable of carrying out the methodology as described herein. Test control macro 140 is operative to activate enabling fuse(s) 120 to enable functional logic(s) 110 in response to application of a thermal cycle that causes set of thermal sensors 130 to sequentially experience a thermal condition(s) matching a thermal sequence enabling test. The "thermal sequence enabling test" (herein after "TSET" for brevity) is a sequence of thermal characteristics as measured by thermal sensors 130 and/or timers 132 that must be matched in order for test control macro 140 to activate enabling fuse(s) 120 to enable functional logic 110. Each IC 100 may include a specific TSET for each functional logic 110 thereon that is to be available for enablement after manufacture using the methodology according to embodiments of the disclosure. Application of a "thermal cycle" includes the controlled application of heat or cold, perhaps for specified durations and/or at specified locations of IC 100 (FIGS. 1-2), to cause a change in temperature at one or more locations on the IC as measured by one or more thermal sensors 130 to match the requirements of a TSET. Each IC 100 may have a predefined thermal cycle to create the TSET that will enable functional logic 110. That is, only application of a specific, predefined thermal cycle particular to the IC will trigger test control macro 140 to activate enabling fuse(s) 120 to enable functional logic 110. Contrarily, test control macro 140 may also be operative to permanently de-activate enabling fuse(s) 120 to permanently disable functional logic 110 in response to the application of the thermal cycle not causing the set of thermal sensors 130 to sequentially experience the thermal condition matching the TSET. In one embodiment, the permanent deactivation/disablement may be in response to a predefined number (i.e., maximum number) of attempts at applying the thermal cycle failing to cause the set of set of thermal sensors 130 to experience the thermal condition(s) matching the TSET. The number of allowed attempts can be any value to provide the desired level of security, e.g., 2, 3, etc.

IC 100 may also optionally include a physically uncallable function (PUF) state machine 150 operatively coupled to test control macro 140. PUF state machine 150 is configured to control access to test control macro 140 based on a public-private key 152. Public-private key 152 may identify a particular IC 100 and allow access only where a user can provide the necessary public-private key 152 for particular IC 100, e.g., test control macro 140 thereof. Where a user cannot provide the necessary public-private key 152, enablement of function logic 110 remains disabled. PUF state machine 150 thus provides an additional level of security.

As shown in FIG. 1, embodiments of the disclosure may also include a system 170 for enabling functional logic 110 in IC 100, i.e., a testing system 170. System 170 can take a variety of forms depending on the state of IC 100, e.g., wafer, single chip, packaged, etc. In any event, system 170 may include a power applicator 172 to apply power to IC 100. Power applicator 172 may include any appropriate interface to apply power to IC 100, e.g., probes for IC in the form of a single chip or wafer, or a test mount if packaged. Power applicator 172 may provide sufficient power for test control macro 140 and inter-related systems to carry out the methodology described herein. Test system 170 may also include a passkey applicator 174 to apply a public-private key 152 to IC 100 to activate test control macro 140 on the IC. Passkey applicator 174 and public-private key 152 may employ any now known or later developed encryption protocol. Public-private key 152 may be specific to a particular type of IC 100, e.g., a particular model. Alternatively, in order to provide higher security levels, each IC 100 may have its own identification accessible by only its own specific public-private key 152.

Figure 3:
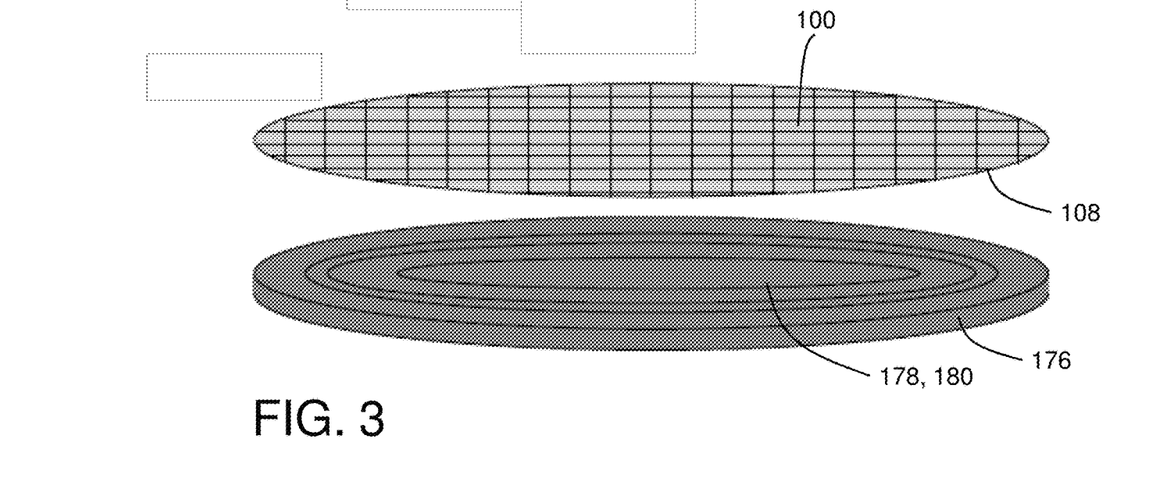
FIG. 3 shows a schematic illustration of a thermal control unit according to one embodiment of the disclosure.
Figure 4:
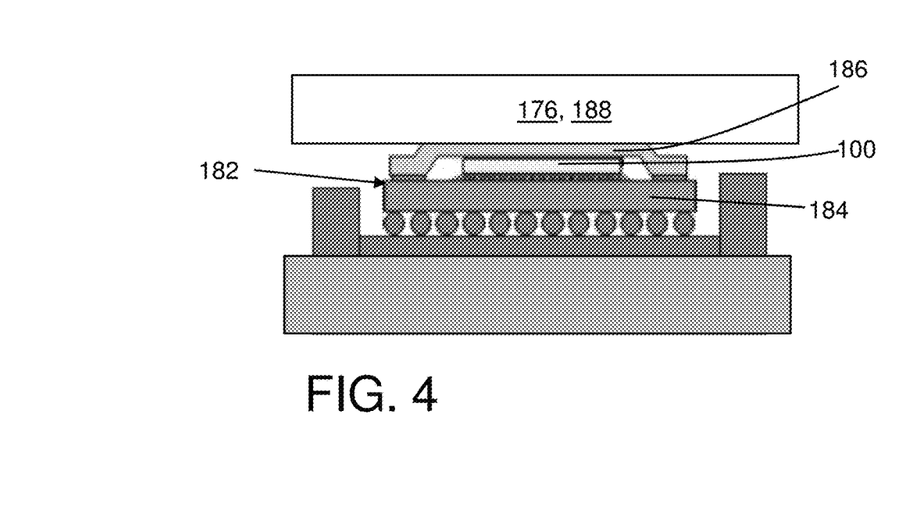
FIG. 4 shows a schematic illustration of a thermal control unit according to another embodiment of the disclosure.
Figure 5:
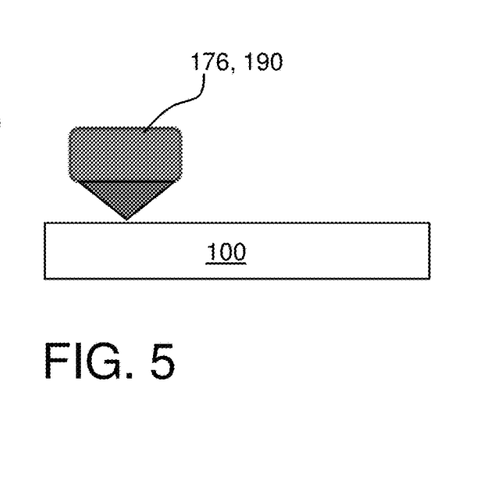
FIG. 5 shows a schematic illustration of a thermal control unit according to yet another embodiment of the disclosure.

System 170 also includes a thermal control unit 176 to apply one of a plurality of predefined thermal cycles 160 to IC 100. Each predefined thermal cycle 160 is configured to create a thermal condition at a set of thermal sensors 130 at predefined locations on IC 100. As noted, and as will be further described herein, test control macro 140 on IC 100 enables functional logic 110 on the IC in response to a predefined thermal cycle 160 causing the set of thermal sensors 130 to sequentially experience thermal condition(s) matching a TSET. Thermal control unit 176 can take a variety of forms depending on the manufacturing state of IC 100. As shown in the perspective view of FIG. 3, where IC 100 is part of a wafer 108, thermal control unit 176 may include a wafer chuck 178 including a thermoelectric system 180 so that the wafer chuck can apply predefined thermal cycle 160 (FIG. 1) across a plurality of ICs 100. As shown in FIG. 4, in another embodiment, IC 100 may be in any now known or later developed IC package 182, i.e., mounted to a printed circuit board (PCB) 184 perhaps with a cover 186. IC package 182 allows scaling up of interconnects to IC 100 and coupling to other electrical elements. In this case, thermal control unit 176 may include an integrated circuit (IC) package thermal control unit 188 capable of applying the predefined thermal cycles to IC 100 while in IC package 182. IC package thermal control unit 188 may couple to the IC through, for example, an exposed top of IC 100, if available, or as shown, through cover 186. As shown in FIG. 5, where IC 100 is a separate, individual chip, thermal control unit 176 may include an integrated circuit (IC) thermal probe head 190 to apply the predefined thermal cycle by sequentially changing thermal condition(s) at each of the set of thermal sensors 130 (FIGS. 1 and 2) in the IC. In this latter case, probe head 190 could mimic any now known or later developed IC thermal probes, and could be positioned in specific locations on IC 100 to heat and/or cool specific thermal sensors 130. Thermal control units 176 shown relative to FIGS. 4 and 5 may be advantageous for enabling in-field, post manufacture, on-demand provisioning of functional logic 110, e.g., by a licensed end user.

Figure 6:
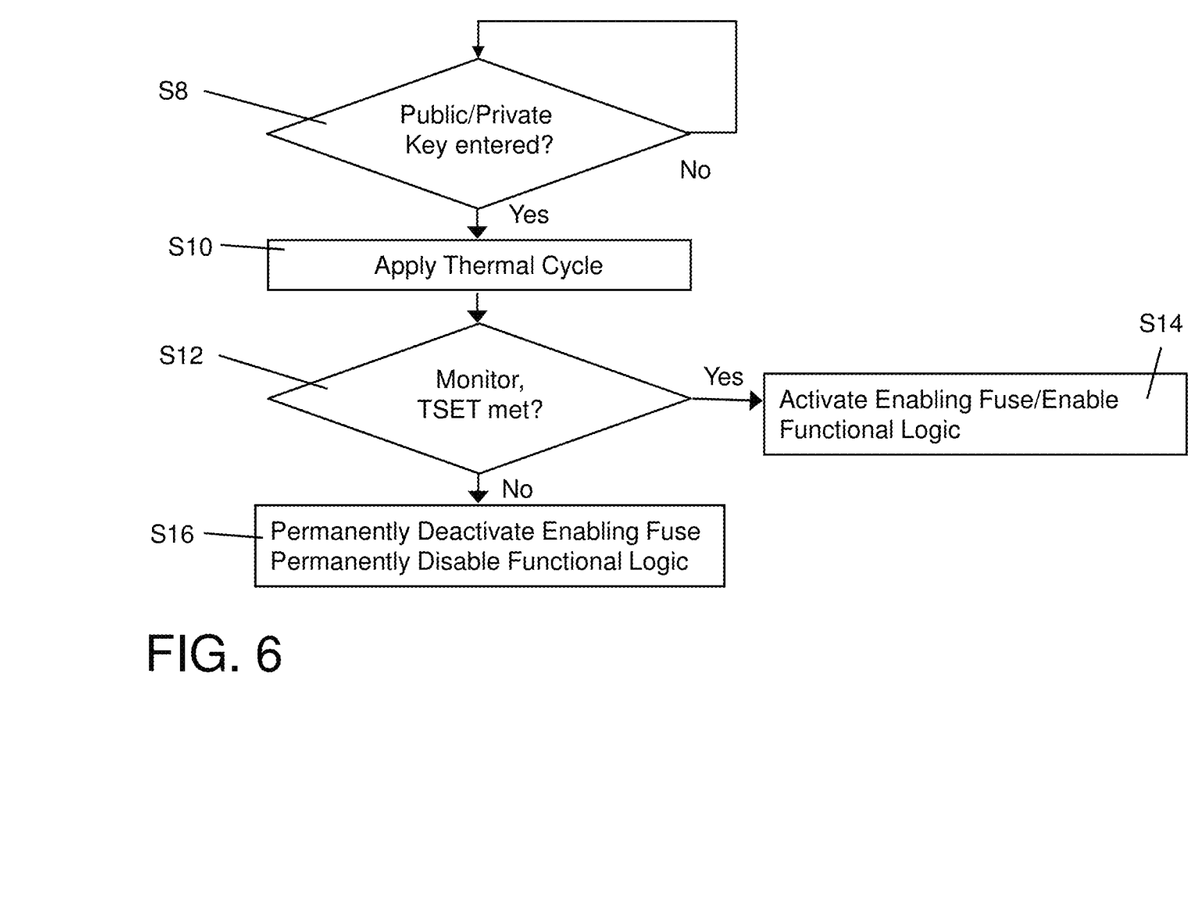
FIG. 6 shows a flow diagram of a method according to embodiments of the disclosure.

Methods according to embodiments of the disclosure will now be described in greater detail relative to the flow diagram of FIG. 6.

In step S8, test control macro 140 determines whether a predefined public-private key 152 (FIG. 1) has been received at PUF state machine 150. If yes at step S8, the process proceeds, e.g., with step S10 (thermal cycle applying), S12 (monitoring), and step S14 (activating) or step S16 (de-activating). That is, only in response to entry of predefined public-private key 152 to PUF state machine 150 on IC 100 does the process to enable functional logic 110 occur.

In step S10, a thermal cycle 160 (FIG. 1) is applied to IC 100. A thermal cycle may be applied to IC 100 using any of the appropriate thermal control units 176 (FIGS. 3-5) described herein, appropriate for the state of IC 100. The thermal cycle is predefined to create the TSET that will allow test control macro 140 to enable functional logic 110. The predefined thermal cycle 160 (FIG. 1) applied may be identified in a number of ways. In one embodiment, it may be identified by public-private key 152, making for precise access and enablement control for each particular IC 100. Alternatively, where a high level of security may not be desired, the predefined thermal cycle 160 (FIG. 1) may be identified by more widely applicable identifiers such as but not limited to IC model number.

In step S12, test control macro 140 monitors at least one of a temperature and a temperature duration at a set of thermal sensors 130 in IC 100. The set of thermal sensors 130 employed may be predefined in a TSET for IC 100, i.e., the set of thermal sensors 130 does not need to be all thermal sensors 130 provided in IC 100. In step S14, in response to thermal cycle 160 (FIG. 1) causing the set of thermal sensors 130 to sequentially experience a thermal condition matching the TSET, i.e., Yes at step S12, test control macro 140 activates enabling fuse(s) 120 in the IC to enable functional logic 110 in the IC. As noted, functional logic 110 is disabled unless enabled by activation of enabling fuse(s) 120. Where a plurality of enabling fuses 120 are employed, they can be sequentially activated by test control macro 140 in response to passing of a respective sub-test of the TSET, e.g., certain steps of the sequence that the TSET requires. That is, test control macro 140 may activate a respective portion of functional logic 110 in response to a thermal sensor, e.g., 130E, of the set of thermal sensors 130 experiencing the thermal condition matching a specified or respective part (sub-test) of the TSET. In this manner, enablement of functional logic 110 can be completed in parts, perhaps with each sequential activation enabling more functions. In contrast, at step S16, in response to thermal cycle 160 causing the set of thermal sensors 130 to not experience the thermal condition matching the TSET, i.e., (fail) No at step S12, test control macro 140 may permanently de-activate enabling fuse(s) 120 to permanently disable functional logic 110.

Figure 7:
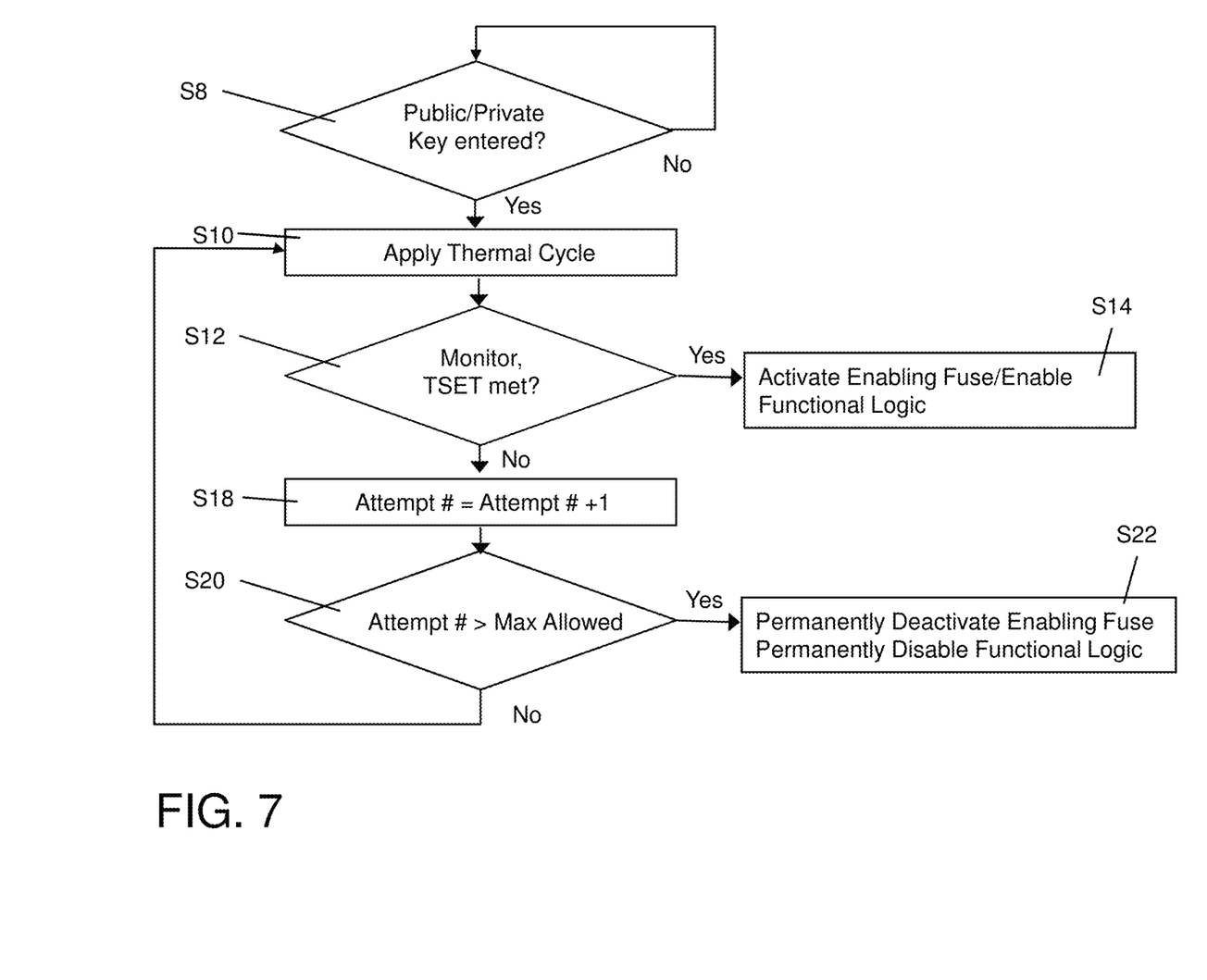
FIG. 7 shows a flow diagram of a method according to other embodiments of the disclosure.

In an optional embodiment, as shown in the flow diagram of FIG. 7, a maximum number of failed attempts to provide a thermal cycle that matches the TSET for IC 100 can be enforced. Here, where thermal cycle does not meet the TSET, i.e., No at step S12, at step S18, test control macro 140 may increment an attempt counter (attempt #) by one, and at step S20, test control macro 140 may determine whether a predefined number (i.e., maximum number) of failed attempts at applying the thermal cycle to cause the set of thermal sensors 130 to experience the TSET, has been exceeded. If No at step S20, test control macro 140 returns processing to step S10 for another attempt. If Yes at step S20, at step S22 (identical to S16 in FIG. 6), test control macro 140 permanently deactivates enabling fuse(s) 120 and permanently disables functional logic 110. The number of allowed attempts can be any value to provide the desired level of security, e.g., 2, 3, etc.

A TSET and the predefined thermal cycle necessary to match a particular TSET can take an extremely large number of forms. To illustrate, a number of non-limiting examples of a TSET follow:

In one embodiment, the TSET dictates only the temperature that each of the set of thermal sensors 130 must experience in a preset order. The set of thermal sensors 130 employed can be defined by the TSET. For example, referring to FIG. 2, the TSET may require six thermal sensors 130A-F, excluding use of thermal sensor 130G. In one example, upon application of the thermal cycle, thermal sensor 130A must measure a temperature of 105° Celsius (C), then thermal sensor 130B must measure a temperature of 70 C, then thermal sensor 130C must measure a temperature of 50 C, then thermal sensor 130D must measure a temperature of 102 C, then thermal sensor 130E must measure a temperature of 50 C, and then thermal sensor 130F must measure a temperature of 25 C.

Figure 8:
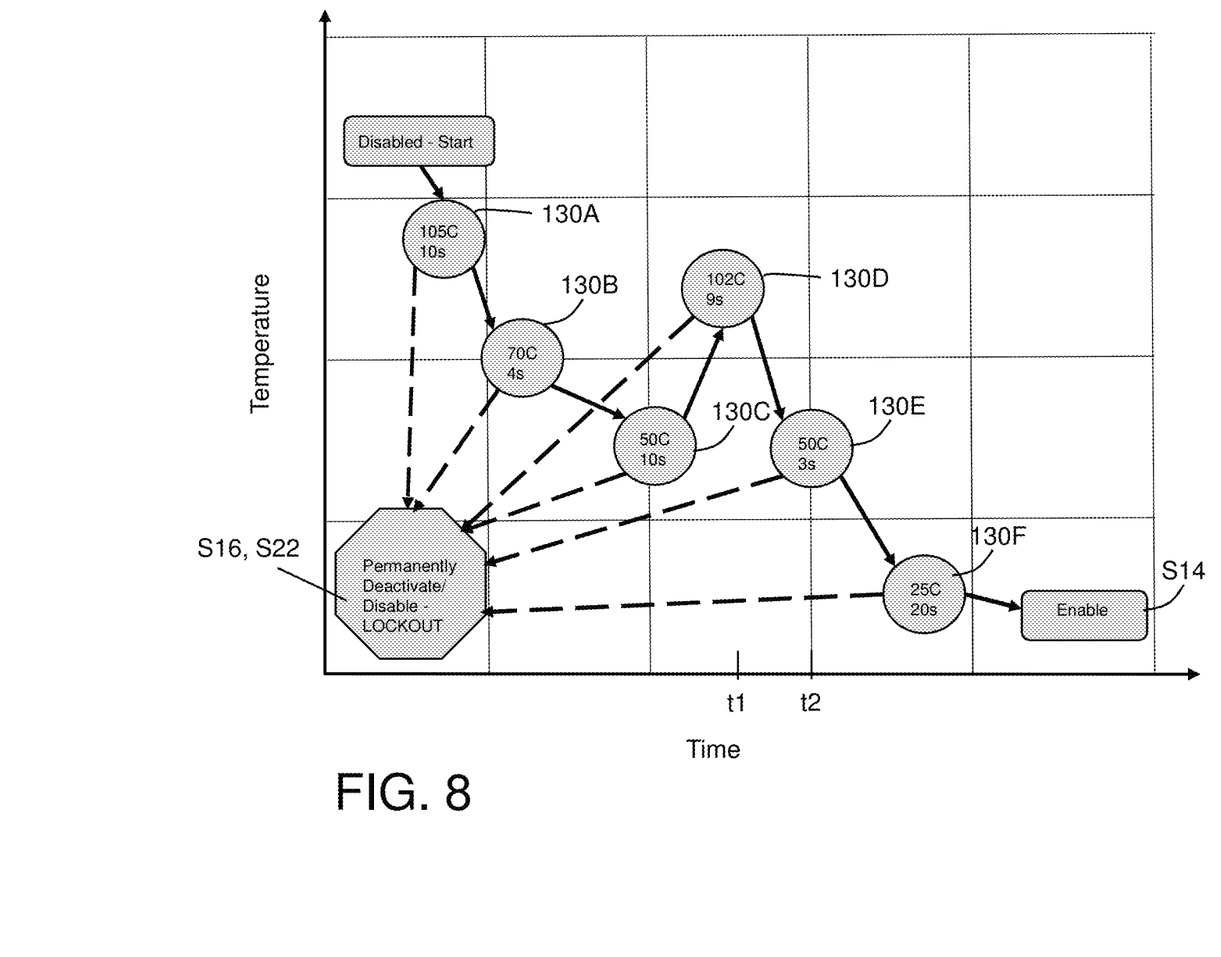
FIG. 8 shows a graphical illustration of a thermal sequence enabling test according to embodiments of the disclosure.

In another embodiment, the TSET may dictate the temperature and a temperature duration that each of the set of thermal sensors 130 (FIGS. 1-2) must experience in a preset order. FIG. 8 illustrates a graphical representation of an example TSET that dictates a preset temperature at a preset duration that each of the set of thermal sensors, e.g., six 130A-F of the seven 130A-G, must experience in a preset order. In FIG. 8, temperature is on the vertical scale and time is on the horizontal scale. Here, six thermal sensors 130A-F are used. In a first part, TSET requires thermal sensor 130A to be at 105 C for 10 s; then thermal sensor 130B must be at 70 C for 4 s; then thermal sensor 130C must be at 50 C for 10 s; then thermal sensor 130D must be at 10 C for 9 s; then thermal sensor 130E must be at 50 C for 3 s; and finally, thermal sensor 130F must be at 25 C for 20 s. If the set of thermal sensors 130A-F progresses through the TSET parts, as denoted by solid line arrows in FIG. 8, after thermal sensor 130F is at 25 C for 20 s, test control macro 140 activates enabling fuse(s) 120 to enable functional logic 110 (step S14 in FIGS. 6-7, as noted). However, if any part of the TSET fails, as denoted by dashed arrows in FIG. 8, test control macro 140 permanently deactivates enabling fuse(s) 120 to permanently disable functional logic 110 (step S16 in FIG. 6 or S22 in FIG. 7 if a fail counter is used, as noted). This latter state is referred to as 'lockout' in FIG. 8.

In another embodiment, TSET may dictate a preset temperature transition rate between a pair of temperatures (T1 and T2) for at least one thermal sensor of the set of the thermal sensors 130. For example, for an illustrative single thermal sensor 130E in FIG. 8, an initial temperature may be 100 C at time t1 (100 C temp not shown), and TSET may require the temperature to drop at −5 C/s prior to reaching 50 C at later time t2. The preset temperature duration may be used alone in a TSET, or with temperature and/or temperature duration.

Figure 9:
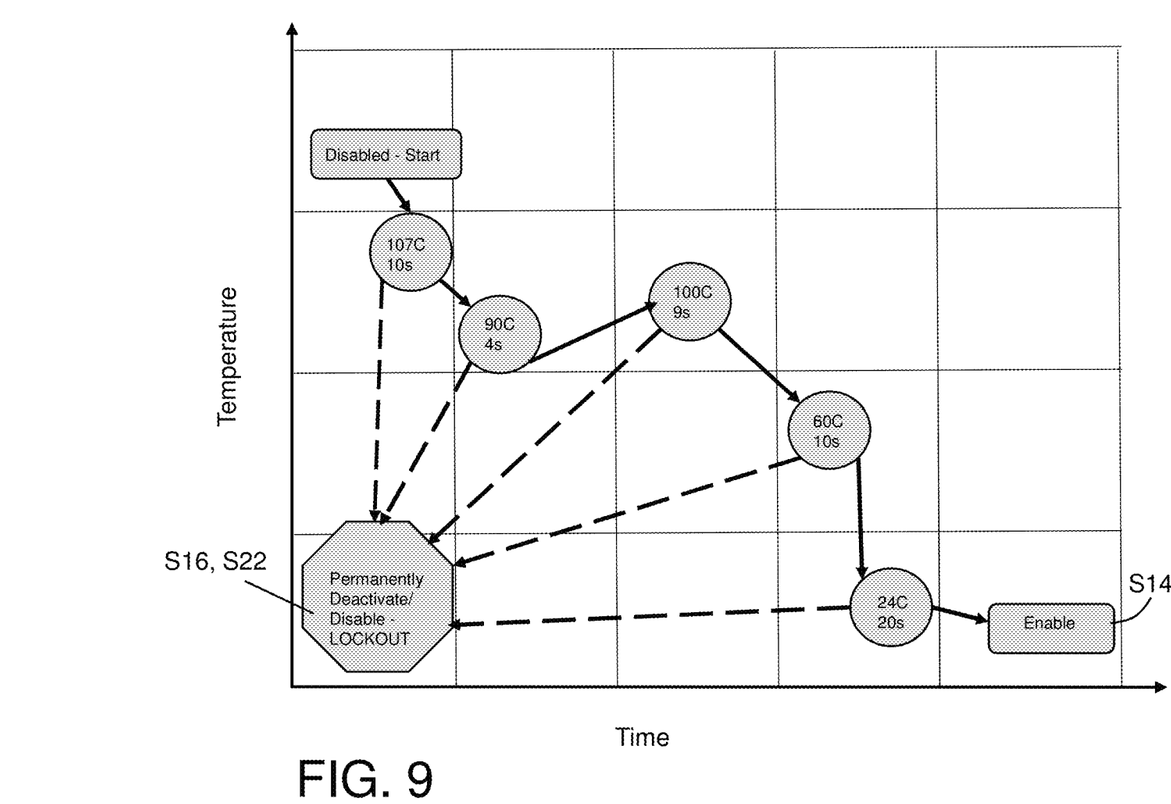
FIG. 9 shows a graphical illustration of a thermal sequence enabling test according to other embodiments of the disclosure.

FIG. 9 shows a TSET for a single thermal sensor 130, i.e., the set includes only 1 thermal sensor. Here, TSET may dictate the thermal sensor steps through the temperatures and durations as indicated. TSET may also require the temperature to drop at some present temperature transition rate, e.g., −5 C/s between two preset temperatures, e.g., between the 100 C and 60 C preset temperature.

Other TSET examples may include: a) six thermal sensors 130A-E may need to measure, for example, 150 C, 100 C, 75 C, 120 C and 20 C, after a thermal cycle applying 150 C across the entire IC 100 for 60 s; b) five temperature levels (e.g., 100 C, 20 C, −10 C, 30 C, 32 C) measured at five specific locations each for a different duration (e.g., 10 seconds (s), 5 s, 10 s, 2 s, 15 s) from a thermal cycle applying the same temperatures to five thermal sensors 130A-E; c) six different temperatures (e.g., 0 C, 120 C, −3 C, 46 C, 100 C, 20 C) at six different locations each for the same duration (e.g., 2 s) to create a required temperature at six thermal sensors 130A-F (FIG. 2), and a preset temperature transition rate of 10 C/s for one thermal sensor from 120 C to 100 C after removal of heat thereto; or d) one temperature level (e.g., 122 C) at two thermal sensors (e.g., 130A, 130G) (FIG. 2).

TSETs can be defined based on any level of security desired, and can be based on modeling of IC 100 (e.g., computational or artificial intelligence modeling) and/or empirical analysis of an IC 100. While particular temperatures, temperature durations and temperature transition rates have been stated, approximations thereof may be acceptable by a TSET, e.g., within +/−2%, etc. In any event, TSETs can be based on natural process variation known for each IC 100, based on actual testing and/or modeling.

As heat and cold can travel through IC 100 to create the temperatures, temperature durations and/or temperate transition rates of a TSET, a predefined thermal cycle applied to IC 100 to create a TSET may not necessarily have to directly create the temperatures at the exact locations of thermal sensors 130. That is, the natural process variations of a given IC plays a part in how a predefined thermal cycle may progress to meet a TSET. For example, the thermal cycle and levels thereof may include a number of temperature levels having different durations, e.g., 4 seconds (s), 2 s, 10 s, 120 s, etc. The thermal cycle and levels thereof may be applied in distributed manner or it may be targeted to create a temperature at the location of certain thermal sensors 130, e.g., heat or cold can be applied at or near a location of a thermal sensor 130. The thermal cycle does not necessarily have to exclusively heat or cold. That is, the thermal cycle may increase a temperature of at least one of the set of thermal sensors 130, and decrease the temperature of others of the set of thermal sensors 130.

The thermal cycle may include any number of predefined temperature levels, application locations and durations. To illustrate, a number of non-limiting examples may include applying a thermal cycle that has: a) four temperature levels (e.g., 50 C, 100 C, 75 C, 120 C) applied across the entire IC for 5 seconds each to create an required temperature to meet the TSET at three thermal sensors 130A-C (FIG. 2); b) five temperature levels (e.g., 100 C, 20 C, −10 C, 30 C, 32 C) applied at five specific locations for a different duration (e.g., 10 seconds (s), 5 s, 10 s, 2 s, 15 s) to create a required temperature to meet the TSET at five thermal sensors 130A-E (FIG. 2), and a particular temperature transition rate (e.g., +3 C/s) between a pair of preset temperatures (T1 and T2)(e.g., −10 C to 30 C) for a particular sensor (e.g., 130 C) to meet the TSET; c) six different temperatures (e.g., 0 C, 120 C, −3 C, 46 C, 100 C, 20 C) at five different locations each for the same duration (e.g., 2 s) to create a required temperature at six thermal sensors 130A-F (FIG. 2) to meet the TSET; or d) one temperature level (e.g., 122 C) applied across the entire IC for 19 seconds to create a required temperature to meet the TSET at three thermal sensors (e.g., 130A, 130E, 130G) (FIG. 2).

Embodiments of the disclosure provide an IC, system and method that provide a significantly increased level of security to protect unintended use of the functional logic on an IC. With the varied temperatures, durations and/or temperature transition rate sequences and the different positions and quantity of thermal sensors that are possible, the number of combinations that can be programmed into the TSET are extremely large. The level of security and the time and effort necessary to reverse engineer (i.e., time to compromise) the IC and create clones, can be customized and greatly increased compared to conventional approaches. The public-private key option adds to the security. In addition, the IC can more readily provide on-demand provisioning of features after manufacturing, e.g., functional changes, upgrades and customization.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An integrated circuit (IC), comprising:
a body including functional logic therein;
an enabling fuse operatively coupled to the functional logic, the functional logic being disabled unless enabled by activation of the enabling fuse;
a set of thermal sensors arranged in a physically distributed manner through at least a portion of the body; and
a test control macro operatively coupled to the set of thermal sensors and the enabling fuse for activating the enabling fuse to enable the functional logic in response to application of a thermal cycle that causes the set of thermal sensors to sequentially experience a thermal condition matching a thermal sequence enabling test.

2. The IC of claim 1, wherein the thermal sequence enabling test dictates a defined temperature that each of the set of thermal sensors must experience in a preset order.

3. The IC of claim 1, further comprising a timer operatively coupled to the test control macro, wherein the thermal sequence enabling test dictates a preset temperature at a preset duration that each of the set of thermal sensors must experience in a preset order.

4. The IC of claim 3, wherein the thermal sequence enabling test further dictates a preset temperature transition rate between a pair of the preset temperatures for at least one of the set of thermal sensors.

5. The IC of claim 1, wherein the test control macro permanently de-activates the enabling fuse to permanently disable the functional logic in response to the application of the thermal cycle not causing the set of thermal sensors to sequentially experience the thermal condition matching the thermal sequence enabling test.

6. The IC of claim 1, further comprising a physically un-callable function (PUF) state machine operatively coupled to the test control macro, the PUF state machine configured to control access to the test control macro based on a public-private key.

7. The IC of claim 1, wherein the enabling fuse includes a plurality of enabling fuses, each enabling fuse operatively coupled to a respective portion of the functional logic, each portion of the functional logic being disabled unless enabled by activation of the respective enabling fuse.

8. The IC of claim 7, wherein each of the plurality of enabling fuses are sequentially activated by the test control macro in response to passing of a respective sub-test of the thermal sequence enabling test.

9. The IC of claim 1, wherein the test control macro permanently de-activates the enabling fuse to permanently disable the functional logic in response to a predefined number of attempts at applying the thermal cycle does not cause the set of thermal sensors to experience the thermal condition matching the thermal sequence enabling test.

10. The IC of claim 1, wherein the thermal cycle increases a temperature of at least one of the set of thermal sensors, and decreases the temperature of at least one of the set of thermal sensors.

11. A method, comprising:
applying a thermal cycle to an integrated circuit (IC);
monitoring at least one of a temperature and a temperature duration at a set of thermal sensors in the IC;
in response to the thermal cycle causing the set of thermal sensors to sequentially experience a thermal condition matching a thermal sequence enabling test, activating an enabling fuse in the IC to enable a functional logic in the IC, the functional logic being disabled unless enabled by activation of the enabling fuse; and
in response to the thermal cycle causing the set of thermal sensors to not experience the thermal condition matching the thermal sequence enabling test, permanently de-activating the enabling fuse to permanently disable the functional logic.

12. The method of claim 11, wherein the thermal sequence enabling test dictates only the temperature that each of the set of thermal sensors must experience in a preset order.

13. The method of claim 11, wherein the thermal sequence enabling test dictates the temperature and the temperature duration that each of the set of thermal sensors must experience in a preset order.

14. The method of claim 13, wherein the thermal sequence enabling test further dictates a preset temperature transition rate between a pair of temperatures for at least one thermal sensor of the set of the thermal sensors.

15. The method of claim 11, wherein the monitoring, the activating and the permanently de-activating steps occur only in response to entry of an predefined public-private key to a physically un-callable function (PUF) state machine on the IC.

16. The method of claim 11, wherein the enabling fuse includes a plurality of enabling fuses, each enabling fuse operatively coupled to a respective portion of the functional logic, and
wherein the activating includes activating a respective portion of the functional logic in response to a thermal sensor of the set of thermal sensors experiencing the thermal condition matching a specified part of the thermal sequence enabling test.

17. A system for enabling a functional logic in an integrated circuit (IC), the system comprising:
a power applicator to apply power to the IC;
a passkey applicator to apply a private-public key to the IC to activate a test control macro on the IC; and
a thermal control unit to apply one of a plurality of predefined thermal cycles to the IC, each predefined thermal cycle configured to create a thermal condition at a set of thermal sensors at predefined locations on the IC,
wherein the test control macro on the IC enables functional logic on the IC in response to the predefined thermal cycle causing the set of thermal sensors to sequentially experience a thermal condition matching a thermal sequence enabling test.

18. The system of claim 17, wherein the thermal control unit includes a wafer chuck including a thermoelectric system, wherein the wafer chuck is configured to apply the one of the predefined thermal cycles across a plurality of ICs.

19. The system of claim 17, wherein the thermal control unit includes an integrated circuit (IC) package thermal control unit configured to apply the one of the predefined thermal cycles to the IC while in an IC package.

20. The system of claim 17, wherein the thermal control unit includes an integrated circuit (IC) thermal probe head, the IC thermal probe head configured to apply the one of the plurality of predefined thermal cycles by sequentially changing a thermal condition at each of the set of thermal sensors in the IC.

* * * * *